US006531867B1

United States Patent
Greene et al.

(10) Patent No.: US 6,531,867 B1
(45) Date of Patent: *Mar. 11, 2003

(54) HIGH STABILITY SPIN STAND PLATFORM WITH AIR BEARING MICROPOSITIONING STAGE

(75) Inventors: Philip M. Greene, Hingham, MA (US); Frank Cutruzzula, Waburn, MA (US)

(73) Assignee: Dover Instrument Corp., Westboro, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/449,299

(22) Filed: Nov. 24, 1999

Related U.S. Application Data

(63) Continuation-in-part of application No. 09/099,046, filed on Jun. 17, 1998, now Pat. No. 6,140,815.

(51) Int. Cl.[7] .............................................. G01R 33/00
(52) U.S. Cl. ..................................................... 324/262
(58) Field of Search ................................. 324/210, 211, 324/212, 262, 755, 758; 369/53.1, 53.2, 53.41, 53.3

(56) References Cited

U.S. PATENT DOCUMENTS

| 4,710,912 A | 12/1987 | Green et al. ............... 369/218 |
| 4,778,143 A | 10/1988 | Koshiba .................... 248/678 |
| 4,902,971 A | 2/1990 | Guzik et al. ................. 324/212 |
| 5,114,302 A | 5/1992 | Meisser et al. .............. 414/751 |
| 5,289,327 A | 2/1994 | Suda ........................... 360/109 |
| 5,339,702 A | 8/1994 | Viches ......................... 73/865.9 |
| 5,672,816 A * | 9/1997 | Park et al. ...................... 73/105 |
| 5,706,080 A | 1/1998 | Pekin et al. .................. 356/72 |
| 5,959,450 A | 9/1999 | Moroe et al. ............... 324/210 |
| 6,140,815 A * | 10/2000 | Greene et al. .............. 324/262 |

FOREIGN PATENT DOCUMENTS

JP 08161717 6/1996

OTHER PUBLICATIONS

XP–002116604 "Multihead Flyability Tester", vol. 32.
International Search Report issued for corresponding PCT application PCT/US00/32101.

* cited by examiner

*Primary Examiner*—Walter E. Snow
(74) *Attorney, Agent, or Firm*—Choate, Hall & Stewart

(57) ABSTRACT

Spin stand platform. The platform includes an air bearing puck forming a micropositioning stage. The puck is constrained for two dimensional motion on a surface. The micropositioning stage supports a read head element under test. At least one actuator moves the puck to a desired location on the surface and apparatus is provided for removing air from the air bearing puck to lock down the puck to the surface at the desired location. It is preferred that the air bearings be vacuum preloaded and that linear motors be used to move the puck.

4 Claims, 2 Drawing Sheets

HIGH STABILITY SPIN STAND PLATFORM WITH AIR BEARING MICROPOSITIONING STAGE

This application is a continuation-in-part of U.S. Ser. No. 09/099,046 filed Jun. 17, 1998, now U.S. Pat. No. 6,140,815. The teachings of this application are incorporated herein by reference.

BACKGROUND OF THE INVENTION

This invention relates to a high stability spin stand platform for testing read/write head assemblies used in computer hard disk drives.

Over the past decade, hard disk drive storage capacities have increased dramatically. This increase in storage capacity has resulted, in part, from the rapidly advancing technological developments in the magnetic sensitivity of the read/write head element. This rapid advancement in technology has made the read head very demanding to manufacture and as a result, virtually all of the read heads manufactured, and certainly all advanced technology heads, require acceptance testing.

The electrical characteristics of the read head are qualified on what is known in the industry as an electrical tester. This test device incorporates a motion platform which mimics the motions of the read head in an actual disk drive. The motion platform usually includes a coarse positioning stage and a micropositioning stage. The electrical tester also incorporates sophisticated electronics which test the read head element. Although the electrical qualification of the read head element has always been demanding, the motion requirements of the electrical tester have only recently pushed the limits of available technology.

As stated above, a two stage motion system typically consists of a coarse positioning stage and a micropositioning stage. In a computer disk drive, the data is stored along a spiral track on the disk. The radial spacing between tracks is as dense as 50,000 tracks per inch (tpi), currently, and as dense as 100,000 tpi is planned in the future. In order to qualify the performance of the read head, it is desirable to have the capability to move the head in discrete motion increments which are two orders of magnitude ($10^2$) less than the track spacing. At 50,000 tpi, this is a motion increment of 0.2 $\mu$inch (5 nanometers). These fine motions are performed by the micropositioning stage which typically includes a piezoelectric crystal which expands and contracts in response to an applied voltage. This device has a very limited range typically on the order of 10 $\mu$m, so that it is necessary to reposition the entire micropositioning stage in order to test the read head at different locations on the disk. Most electrical tester configurations require a full range travel of 100 to 150 mm. In an actual disk drive, the read head traverses from the outer radius to the inner radius of the disk drive along an angular path (the head is mounted to a swing arm, similar to a record player) and thus, the relative angle of the head changes relative to the vector tangent to the servo tracks. This change in angle is termed the skew angle and variations in the skew angle have an effect on the performance of the head. In some electrical testers, however, the head is moved in a Cartesian XY plane. It can be shown mathematically that the complete range of skew angles can be recreated by moving the head to various XY positions. This attribute makes these testers very flexible to different disk drive configurations in which the disk diameter and pivot angle of the drive arm vary.

A typical testing sequence for an electrical tester begins with the read head assembly, consisting of read heads mounted to a flexure arm, being mounted into a fixture (often referred to as the "nest") on a micropositioning stage. A spindle for supporting a magnetic disk is accelerated to an operating speed, typically 5,400 to 20,000 rpm. A coarse positioning stage moves the read head to a first test position and the read head is commanded to perform an adjacent track erase, in which all magnetic information on the disk is erased for the test track and for the adjacent inner and outer tracks. The read head is then commanded to write a stream of data to the disk of some finite length, typically less than a full rotation of the disk. The micropositioning stage then moves the head "off-track", usually to the position of what would be the next adjacent track to verify that the magnetic information from the test track cannot be sensed from the adjacent track. The micropositioning stage then moves the head across the test tract in discrete motion increments as small as 5 nm to correlate the intensity of the magnetic data on the test track to the radial position on the disk. In many newer heads in which the read and write heads are not co-located, this test also determines the relative spacing of the read and write elements. The coarse positioning stage is then moved to subsequent test points and the above steps are repeated. At the end of the test, the coarse positioning stage fully retracts to the load position and the read head assembly is exchanged for an untested assembly.

In order to optimize the total cycle time for the test sequence, it is highly desirable for the discrete motion increments of the micropositioning stage to be completed (both move time and time to settle within a stability band such as 10 nm) in less time than is required for a single rotation of the disk (e.g., 0.003 seconds at 20,000 rpm). This goal is not currently achievable with existing designs.

The principle elements of prior art testers are a high speed air bearing spindle and a two stage motion system (i.e., a coarse positioning stage and a micropositioning stage). Existing tester designs typically utilize XY stacked stages, whether air bearing or mechanical. The stacked stages limit the capability of the micropositioning stage due to the dynamics of the stacked stage design. Even when an individual stage is made to be stiff, the ultimate structural dynamics for each stage are determined by the limitations of the drive actuator of the orthogonal stage axis. Such stages typically use leadscrew drives which have limited stiffness. Even the most rigid stacked stage designs have 1st mode natural frequencies of less than 200 Hz Thus a single period of oscillation due to an external perturbation will take 0.005 seconds. Therefore, any positional perturbations due to the reaction forces from the micropositioning stage which exceed a stability band of 10 nm in magnitude make it impossible to achieve the goal of a sub-5 millisecond micropositioning move. In actual application, it is desirable for the coarse positioning stage to have a 1st mode natural frequency in excess of 1 kHz U.S. patent application Ser. No. 09/099,046, of which the present application is a continuation-in-part, disclosed a spin platform using air bearings and a split axis design with a vacuum lock down capability.

Due to the continually increasing storage density of disk drives, the testing of read/write heads currently in development will require levels of position stability that is difficult to achieve with current technology. In addition, constant price pressure due to a competitive marketplace is requiring increases in manufacturing throughput. As a result the spin stand platform now needs to move the read head under test more rapidly while at the same time providing a high level of positional stability. The typical stability requirement for the coarse positioning stage is to have no more than ±10 nm of variation in position over a period of several seconds. An additional requirement is that once positioned, the coarse stage must be extremely rigid so that reaction forces from the moving piezo stage and imbalance forces from the rotating spindle induce very little motion (in the form of vibration) in the coarse positioning stage. The relative position of the read head with respect to the spindle must remain stable within the ±10 nm band; thus any motion of the coarse positioning stage will compromise this level of performance.

The spin stand platform of the invention was conceived in order to provide several key advantages over existing spin stand platforms. A primary advantage is in the area of position stability under test. The spin stand platform of the invention can accommodate the stringent requirements resulting from ever denser radial spacing of tracks on computer disk drives.

SUMMARY OF THE INVENTION

In one aspect, the spin stand platform of the invention includes an air bearing puck forming a micropositioning stage, the puck constrained for two dimensional motion on a surface. The micropositioning stage is adapted to support a read head element. At least one actuator is provided for moving the puck to a desired location on the surface. Apparatus is provided for removing air from the air bearing puck to lock down the puck to the surface at the desired location. In a preferred embodiment, the puck is vacuum preloaded to stiffen the air film. A quick dump valve is provided to supply air to the air bearings to result in rapid operation.

It is preferred that there be two actuators, one actuator for moving the puck in a first direction and a second actuator for moving the puck in a second direction orthogonal to the first direction. It is also preferred that the two actuators be linear motors. In this embodiment the puck is constrained by an air bearing rail employing a combination of vacuum preload and magnetic preload.

DESCRIPTION OF THE PREFERRED EMBODIMENT

Figure 1:
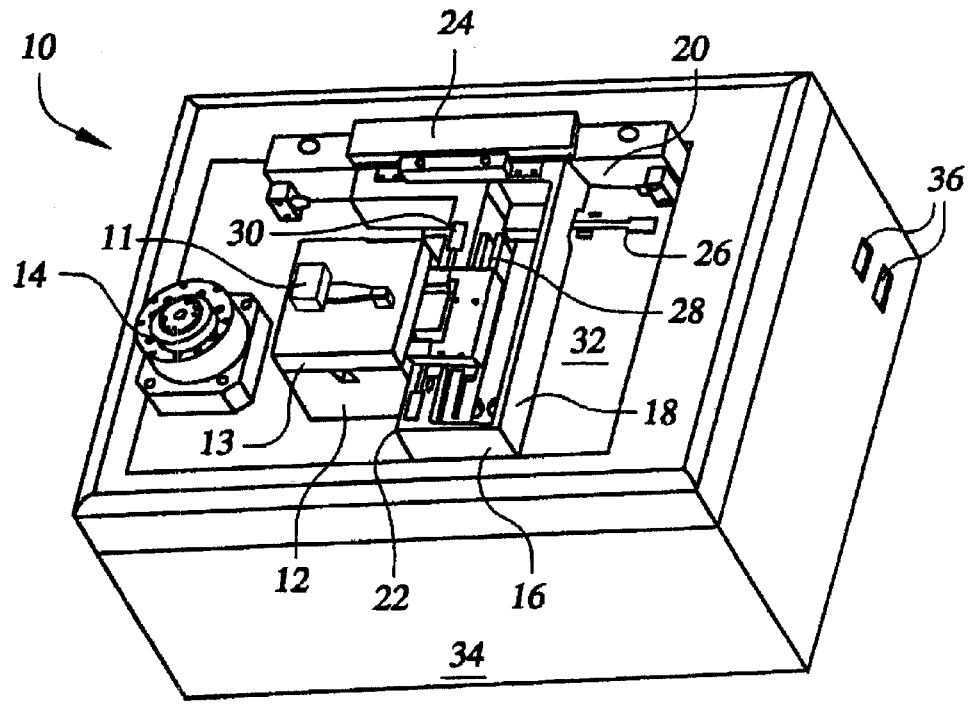
FIG. 1 is a perspective view of the high stability spin stand platform of the invention.
Figure 2:
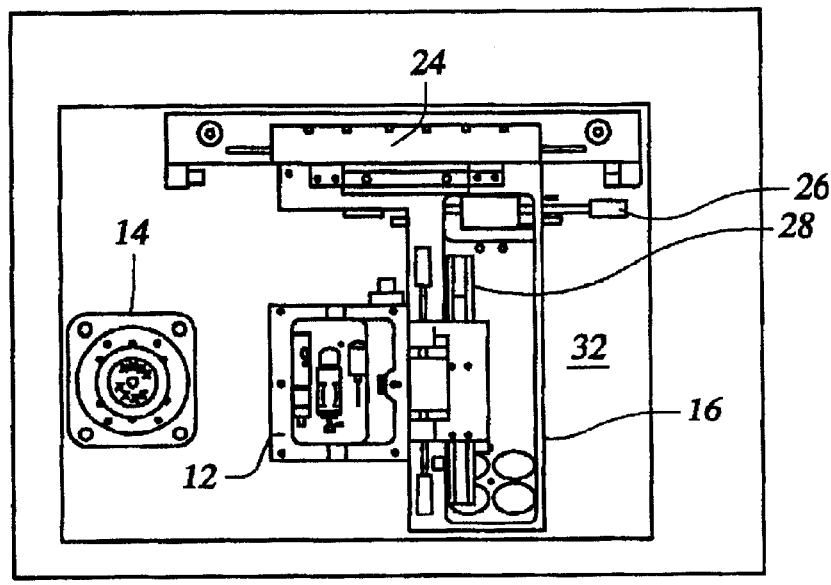
FIG. 2 is a top view of the spin stand platform of FIG. 1.

With reference to FIGS. 1 and 2, a spin-stand platform 10 of the invention includes a vacuum lock down puck 12 which is adapted to carry a micropositioning stage 13 on its upper surface. The puck 12 carrying a micropositioning stage cooperates with an air bearing spindle 14 carrying a test disk (not shown) for performing electrical qualification tests of a read head element 15 on the micropositioning stage.

The vacuum lock down puck 12 is supported for two dimensional motion in a plane by an air bearing rail 16. The air bearing rail 16 is vacuum preloaded at location 18 and magnetically preloaded at locations 20 and 22. The rail 16 moves left and right in FIG. 1 under the control of a linear motor 24. The motor 24 receives position information from a non-contact linear encoder 26.

The puck 12 moves along the rail 16 under the control of a second linear motor 28 which receives position information from a non-contact linear encoder 30. With the arrangement just described, the puck 12 can thus move in two dimensions over a granite base 32.

A steel enclosure 34 contains all the pneumatic equipment for the air bearing puck 12, air bearing rail 16 and air bearing spindle 14. Within the enclosure 34 also resides electronics including a DMM2100 servo controller. Power buttons 36 control the servo controller (not shown).

Figure 3:
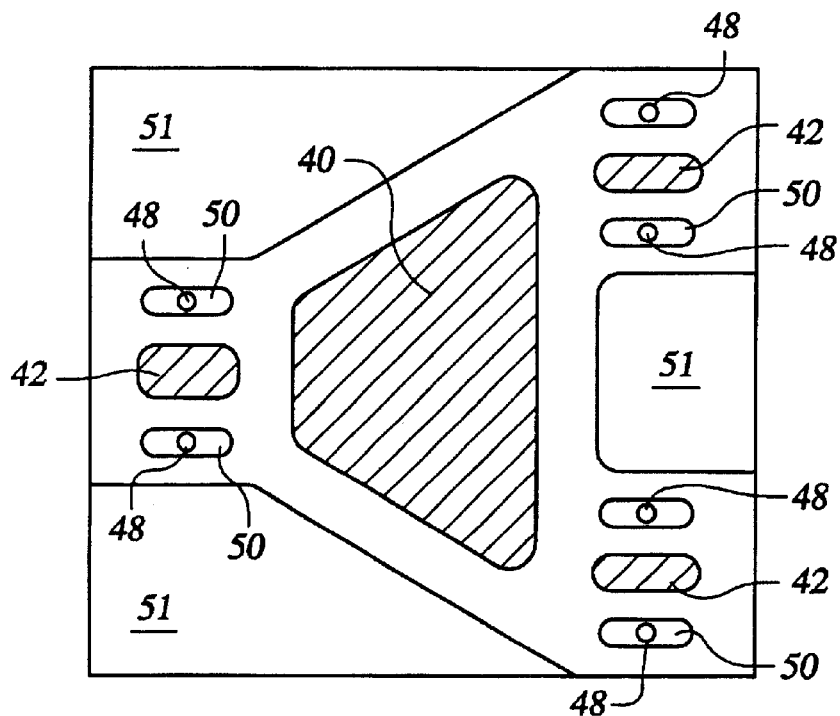
FIG. 3 is a bottom view of the air bearing puck.

FIG. 3 shows the air bearing surface used on the vacuum lock down puck 12. As background, an air bearing is formed when pressurized air is introduced into the gap between two flat plates. In order for the air bearing to support a load, there must be a positive pressure in the region between the flat plates. Because air has very low viscosity, the gap between the two plates needs to be very small in order for the surface friction between the plates and the air to restrict the flow of the air, thus creating a pressure differential. Typically, the gap is on the order of 5 to 10 $\mu$m. This very small gap also requires that the plates be flat on the order of 2 $\mu$m, making the air bearings difficult to manufacture.

The pressurized air in the gap between the plates has a natural tendency to expand resulting in an increased gap. As the air expands, the air film pressure is reduced which reduces stiffness of the air film. Because a stiff air film is desirable, the gap must be reduced. This reduction is accomplished by introducing a force opposite to the film pressure. This mode of operation is referred to as "preloading" the air film. Preloading can be accomplished by using an opposing air bearing, by weight (gravity), by magnetic force or, in the present case, by drawing a vacuum.

In FIG. 3 vacuum regions are shown as shaded areas. The puck 12 has a bottom surface that includes a large central vacuum region 40 and smaller vacuum regions 42. The vacuum regions 40 and 42 are recessed surfaces which are parallel to the main air bearing surface. Air is evacuated from these regions to create a negative pressure which applies the preload force. The bearing also includes orifices 48 through which pressurized air is introduced into the air bearing. Surrounding these orifices 48 are oval shaped regions 50 which are slightly recessed, on the order of 12 $\mu$m from the air bearing surface. These regions 50 function to stabilize the pressure in the bearing and to evenly distribute the supply air. This design also includes relieved areas 51.

What differs in this air bearing design from conventional air bearing designs is that in addition to the large central vacuum regions 40, the small regions 42 are included between the inlet orifices 48. In addition to preloading the air bearing, these regions also help to evacuate the air film when the supply air pressure is turned off. This configuration facilitates the rapid "lock down" of the bearing of the invention. Without these regions 42, the air film would have to be "squeezed" out from between the plates. The addition of these regions significantly reduces the time for the system to achieve full stability after the lock down is applied. This puck design also incorporates a kinematic (3 point) layout for the air bearing pads as shown in FIG. 3. This design reduces distortion due to load transference when the puck is brought into contact with the machine base plate.

Figure 4:
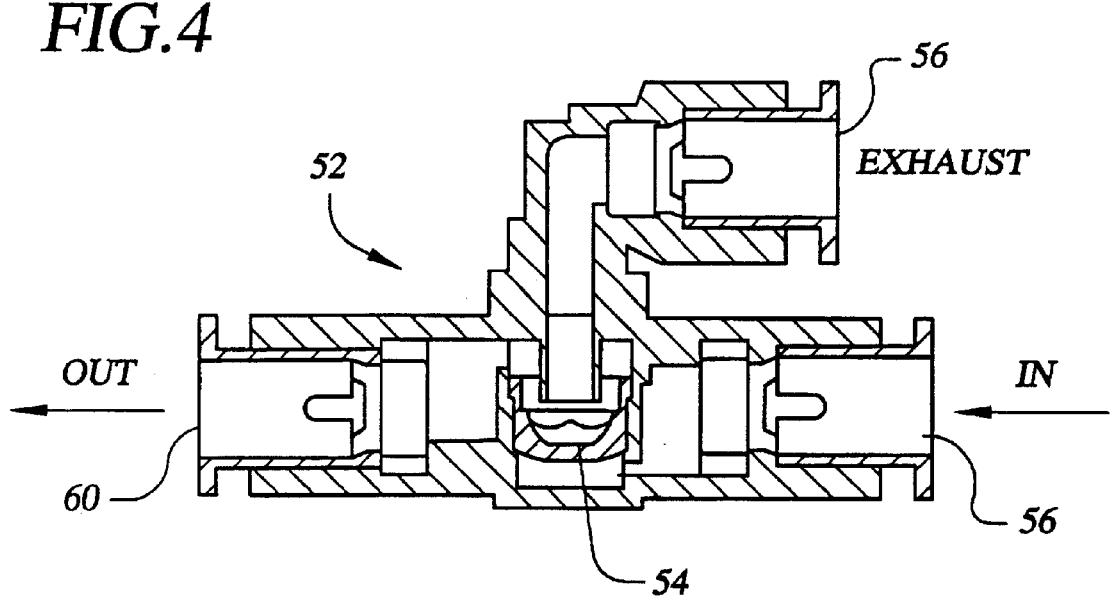
FIG. 4 is a cross-sectional view of a quick dump valve for use in the invention.

It is preferred that a pneumatic "quick dump" valve 52 as shown in FIG. 4 be used to supply air to the air bearing puck 12 and air bearing rail 16. Supply air is turned on and off electronically using a solenoid controlled air valve (not shown). In order to overcome the restricted flow of a solenoid valve, the quick dump valve 52 is used at the air inlet to the system. The quick dump valve 52 employs a moveable rubber seal 54. The moveable rubber seal 54 opens and closes a large, free flowing exhaust port 56 in the valve. As long as the supply pressure at an inlet 58 is higher than the pressure in the bearing (and in an outlet port 60), the exhaust port 56 is closed. As soon as the supply pressure drops (when the solenoid valve is switched off) the rubber seal 54 opens the exhaust port 56 allowing the pressure in the air bearing to drop rapidly. The quick dump valve 52 thus allows the solenoid valve to be remotely located. Air is exhausted much more quickly than if air traveled through an air hose and exhausted through the solenoid because of pneumatic restrictions. A suitable quick dump valve 52 is available from SMC Pneumatics, Inc. of Tokyo, Japan.

The system of the inventions provides frictionless motion with no moving parts, no wear and no required maintenance in the form of lubrication or periodic. replacement of components. This is a major advantage over motion stages which use leadscrews and rolling element bearings which require both lubrication and periodic replacement.

In operation, the motion controller in the enclosure 34 controls the linear motors 24 and 28 to move the puck 12 to desired locations monitored by position encoders 26 and 30. Upon arrival at a desired location, air is rapidly removed from the air bearing through the quick dump valve 52 which locks the puck 12 to the granite base 32. At this time, fine position adjustments are made by a micropositioning module carried on the puck 12.

It is recognized that modifications and variations of the invention disclosed herein will be apparent to those skilled in the art. It is intended that all such modifications and variations be included within the scope of the appended claims.

What is claimed is:

1. Spin stand platform comprising:
   an air bearing puck for supporting a micropositioning stage, the puck constrained for two-dimensional motion on a surface, the micropositioning stage adapted to support a read head element;
   at least one actuator for moving the puck to a desired location on the surface; and
   apparatus for removing air from the air bearing puck to lock down the puck to the surface at the desired location, wherein the puck is vacuum preloaded.

2. Spin stand platform comprising:
   an air bearing puck for supporting a micropositioning stage, the puck constrained for two-dimensional motion on a surface, the micropositioning stage adapted to support a read head element;
   at least one actuator for moving the puck to a desired location on the surface; and
   apparatus for removing air from the air bearing puck to lock down the puck to the surface at the desired location and further including a quick dump valve for removing air from the air bearing puck.

3. Spin stand platform comprising:
   an air bearing puck for supporting a micropositioning stage, the puck constrained for two-dimensional motion on a surface, the micropositioning stage adapted to support a read head element;
   at least one actuator for moving the puck to a desired location on the surface; and
   apparatus for removing air from the air-bearing puck to lock down the puck to the surface at the desired location, wherein the puck is constrained by an air bearing rail employing a combination of vacuum preload and magnetic preload.

4. Spin stand platform comprising:
   a vacuum preloaded air bearing puck constrained for motion on a surface;
   an actuator for moving the puck to a desired location on the surface; and
   apparatus for removing air from the air bearing puck to lock down the puck to the surface at the desired location.

* * * * *